INVENTOR
Thomas John Robert Bright
BY Stevens, Davis, Miller + Mosher
his ATTORNEYS Patented Jan. 5, 1954

2,664,602

UNITED STATES PATENT OFFICE 2,664,602

DRAUGHT EXCLUDING STRIP

Thomas John Robert Bright, Blackdown, near Leamington Spa, England

Application August 13, 1951, Serial No. 241,672

3 Claims. (Cl. 20—69)

This invention relates to draught excluding or sealing strips, such components being hereinafter referred to as strips and being composed of a soft but resilient material such as, for example, rubber. Such strips which form the subject of the present invention are mounted in position on a supporting flange and are employed where it is desired to exclude draughts and generally provide a good sealing between two components.

The invention is particularly concerned with the production and application of such strips to the doors of motor vehicles for draught excluding or sealing purposes in which case the supporting flange will form a part of the vehicle body or door, the strip being mounted on the flange in a position in which the strip will be sandwiched between the flange and door or in the case of the flange forming part of the door, between the flange and a part of the vehicle body, the strip being compressed under the closing action of the door to provide a good seal. It will be appreciated that from the manufacturing point of view it is very desirable that such strips shall be capable of being quickly secured in position upon their supporting flanges and that once in position there shall be no risk of accidental detachment of the strip when the vehicle is in use.

Examples of such strips are disclosed in the specifications and drawings of my prior British Patents Nos. 649,137, 655,268 and 655,299, such patents not only covering the construction of the strip itself, but also the manner in which it is applied.

The strip in accordance with the present invention includes an effective portion composed of a soft but resilient material, such as rubber, carried by a channel shaped metal clip so constructed as to embrace a supporting flange and grip the latter or a part carried by said flange to maintain its position thereon, the effective portion including an integral lip, bead or other protuberance adapted to overhang the adjacent edge of the channel shaped clip and engage the flange on which the strip is mounted so as to protect the channel shaped clip and its associated parts against the ingress of rain or other moisture.

It will be appreciated that the edge of the lip on the effective portion being composed of rubber or like material will make an effective seal with the adjacent face of the supporting flange and in this way will prevent rain or other moisture finding its way between the effective portion and the supporting flange. Such an arrangement is particularly useful where the strip occupies a horizontal position, i. e., when it lies above a car door or is used as a seal to prevent moisture finding its way downwards between a sliding window and a car window sill, the effective part of the strip engaging the glass of the window whilst its associated lip engages the supporting flange which in turn forms a part of the window sill.

In order that the invention may be clearly understood and readily carried into effect the invention is hereinafter described with reference to the accompanying drawings in which.

Figure 1:
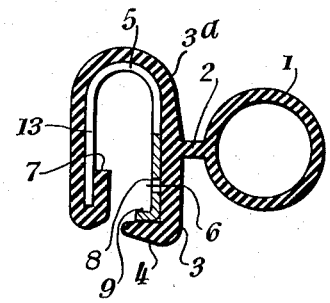
Figure 1 is a transverse section drawn to an enlarged scale of a draught excluding or sealing strip in accordance with the invention showing one method of securing the rubber component in position on the metal clip.

In the construction illustrated the strip is in the form of a rubber extrusion, the effective portion 1 being of tubular form having a short necklike extension 2 leading to a base 3 which at one edge is formed with an inwardly directed lip 4 which lies at right angles to the base. The base serves for the attachment of the rubber component to a channel shaped attachment clip 5, the parts being connected by a line of sewing 6 in the case of Figures 1 and 3.

The base 3 has an integral upward extension 3a which extends around the metal clip 5 and has a hook shaped part 7 which engages over the opposite edge of the part 5 and with the assistance of the line of sewing 6 secures the strip in position on the component 5. The part 3a is of reduced thickness and it is within the scope of the invention to produce the part 3, 3a of the strip of the U shape shown or in flat form and to apply the strip to the clip 5 either before or subsequent to the latter being bent into U shape.

Figure 3:
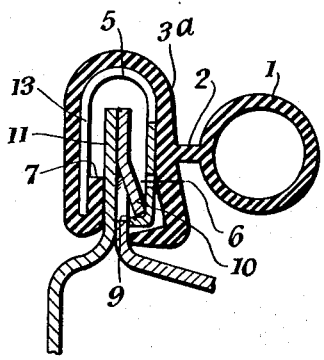
Figure 3 is a view of the construction of strip illustrated in Figure 1 in position on a supporting flange.

Suitable holes 8 are formed in the metal clip for the passage of the sewing needle whilst the metal clip is formed with an integral marginal inwardly directed lip 9 adapted as shown in Figure 3 to override a lateral projection 10 on the supporting flange 11 or a series of spring tags mounted on the flange as shown in the drawings of my earlier British Patent No. 649,137 and provide a positive interlocking engagement between the parts.

Figure 3 shows how the lip 4 engages the face of the supporting flange 11 to provide a good seal and prevent moisture finding its way into the interior of the metal clip and onto the surfaces of the adjacent parts. It will be seen that the length of the lip 4 is such that the base 3 immediately below the line of sewing will be sprung away from the metal clip to thereby press the edge of the lip into good sealing engagement with the flange 11.

Figure 2:
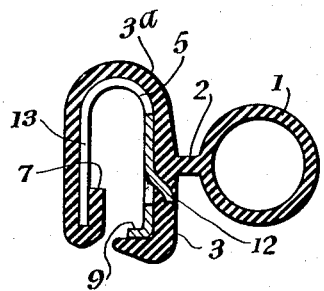
Figure 2 is a similar view showing an alternative method of fastening.

Although it is within the scope of the invention to use an adhesive to secure the rubber component in position on the clip it is preferred to employ either the single line of sewing shown in Figures 1 and 3 or the alternative method illustrated in Figure 2 in which a series of tangs 12 are pressed out of the metal U-shaped clip and perforate or partially perforate the base 3 to secure the rubber component in position upon the U-shaped clip with the assistance of the marginal hook 7, the tangs being bent over to obtain a secure grip on the rubber component.

As is shown clearly in Figure 3 the hook shaped part 7 engages the supporting flange 11 and in this way provides a good seal on the inside of the vehicle and prevents the escape of warm air from the interior of the vehicle through the U-shaped metal clip such an arrangement being particularly desirable in the case of a vehicle fitted with air conditioning apparatus.

The clip 5 extends throughout the length of the rubber strip and is preferably slotted transversely at spaced points throughout its length as at 13 so that it can be bent easily to curves of small radius. For example, slots may be formed in the strip from which the clip is formed which slots extend inwardly from opposite edges of the metal strip and from non-oppositely disposed points, the slots extending across the major part of the width of the strip.

That part of the strip which would normally be seen from the interior of the vehicle is preferably coated with a flock or other covering to harmonise with the interior decorations of the vehicle or may have a suitable harmonious pattern imparted to it during the moulding operation. As a further alternative it may be covered with an ornamental fabric or other covering strip which may be stitched, cemented or otherwise secured thereto.

The strip will be mounted on the usual flange 11 on the vehicle body surrounding the door openings or alternatively on a flange on the door itself so that the rubber lip will by its engagement with the metal flange exclude rain or other moisture which might otherwise find its way into the channel shaped clip, the tubular part of the strip being compressed to a greater or less extent between the door and the fixed part of the vehicle body surrounding the door opening to provide a good draught and moisture proof seal, the lip on the rubber strip serving to trap rain or other moisture which although excluded from the vehicle by the sealing action of the tubular part might nevertheless find its way around the door edge and through the space necessarily left between the edge of the door and the adjacent part of the body or in the case of the strip being associated with a sliding window might collect between the window and sill, and eventually find its way into the interior of the channel shaped attachment member and onto the fabric or other covering if provided.

I claim:

1. A draught excluding strip for vehicle doors comprising an effective portion of soft but resilient material compressible between the door and a fixed part of the vehicle to provide an efficient seal, a channel shaped metal clip carrying said effective portion and closely embraced thereby, said clip having an inwardly directed lip for maintaining a snap-on connection with a supporting flange on the vehicle, said effective portion having an integral lip directed inwardly towards the center of the mouth of said clip to engage the supporting flange and exclude moisture from the interior of said clip, said effective portion being held in position on said clip by having one edge turned over one edge of said clip and secured to the other limb of said clip by fastening means so spaced from the integral lip of said effective portion as to permit of flexure of that part of said effective portion which carries the integral lip an amount sufficient to enable said integral lip to make good sealing engagement with the flange.

2. A draught excluding strip as claimed in claim 1, wherein the fastening means consists of a row of stitching extending lengthwise of the clip.

3. A draught excluding strip as claimed in claim 1, wherein the fastening means consists of a line of spaced tangs pressed out of the clip and penetrating the effective portion.

THOMAS JOHN ROBERT BRIGHT.

References Cited in the file of this patent

UNITED STATES PATENTS

| Number | Name | Date |
|---|---|---|
| 2,348,319 | Bailey | May 9, 1944 |
| 2,464,406 | Kramer | Mar. 15, 1949 |
| 2,554,452 | Bright | May 22, 1951 |
| 2,602,202 | Orr | July 8, 1952 |
| 2,603,528 | Higbie | July 15, 1952 |